Patented Dec. 5, 1933

1,938,046

UNITED STATES PATENT OFFICE 1,938,046

PROCESS FOR SEPARATING ALUMINIUM ALLOYS

Oskar Schober, Horrem, near Cologne, Germany, assignor to American Lurgi Corporation, New York, N. Y., a corporation of New York No Drawing. Application October 3, 1931, Serial No. 566,813, and in Austria and Germany October 6, 1930

2 Claims. (Cl. 75—58)

This invention relates to a process for separating aluminium alloys high in silicon into low- and high-silicon alloys by liquation.

It is known that aluminium alloys that are high in silicon can be separated, by means of so-called liquation processes, into a fraction that is comparatively low in silicon, and another fraction that is relatively high in silicon. Various methods of carrying out liquation processes have already been suggested in which the material, which is partly liquid and partly solid at the temperature of separation, is resolved into its components by suitable methods, such as centrifuging.

In the treatment of aluminium alloys high in silicon by liquation I have found it to be particularly advantageous to perform the operation with the aid of filter beds of refractory material, in the form of grains or small lumps. For example, a perforated iron plate is laid on a metal grating (for example, of iron) and covered with a bed of sufficiently refractory material, such as fire-brick, granite, feldspar and the like, in the state of grains or small lumps. The aluminium-silicon alloy, produced by an electrothermic process, is placed on this bed, and is subjected to liquation at a suitable temperature, the filtering vessel being preferably closed, after being charged with the hot alloy subjected to liquation, whereupon a suitable gas or gaseous mixture—preferably in a preheated condition—is introduced from above under pressure. Under these conditions, about 50–60% of the alloy passes through the filter bed in the form of a low-silicon fraction, the high-silicon fraction remaining as a residue, on the filter bed. In addition, the filter retains impurities, such as extraneous metals, unreduced alumina and carbides, which were present in the starting material, so that a low-silicon alloy that is free from these impurities, is obtained.

Instead of being forced through the filter with the aid of gases under pressure, the alloy components that are liquid at the liquation temperature can be drawn through by suction. The pressure method, however, is found to be simpler and more advantageous, and, in particular, enables higher yields to be obtained.

Substances particularly suitable for the filter bed are those which can be returned, along with the alloy remaining on the bed, to the electrothermic process for producing the aluminium-silicon alloy, such as alumina or quartz, or the high-silicon fraction from previous liquations, reduced to suitable grain size. In such case, the filter bed and its contents can be returned to the electrothermic process after several—e. g. 2 to 6—filtrations.

The grain size of the filtering material may vary, for example between 1 to 6 millimetres. In general, grains measuring 2 to 4 mm. have proved suitable, it being advisable to reduce the grain size as the silicon content of the original alloys falls. If desired, the filtering material may be of different grain sizes, disposed, for example, in layers of progressively coarser grain downwards.

The depth of the filter bed may range, for example between 1 and 10 cm. For practical purposes, depths of about 3 to 8 cm. have generally been found very suitable.

The liquid alloy can be forced through the filter bed by means, for example, of air, nitrogen, carbon dioxide or other gases which are inert at liquation temperature, such gases being preferably as free as possible (e. g. pre-dried) from moisture, in order to prevent any injurious action on the original alloy or its components at the liquation temperature.

Temperatures of 575 to 750° C. for example, have been found very suitable for carrying out the liquation treatment. In the case of 16 to 18% Al-Si alloys, temperatures of, for example, 600 to 620° C., and for 20 to 22% alloys, temperatures of 650 to 700° C. have been found suitable. The original alloy is brought to liquation temperature either by introducing the alloy in the solid state on to the filter bed, and heating it to the requisite temperature by means of suitable heating devices, or—in a particularly favourable manner from the standpoint of heat economy—by charging the very hot and completely fluid alloy on to the filter bed and allowing it to cool slowly down to liquation temperature before applying the pressure or suction. The gases serving to force the liquid alloy components through the filter bed are preferably pre-heated, for example to approximately liquation temperature, or even somewhat higher if desired. The pressure to be applied may range between 0.5 and 10 atmospheres, preferably between 2 and 5 atmospheres.

In order to obtain high yields it has been found beneficial to employ alloys containing not more than 33%, and preferably between 30 and 33%, of silicon.

The herein described liquation process may be applied, with particular advantage, for example in the electrothermic production of Al-Si alloys with a silicon content of about 12 to 14% which, under the name "Silumin", have attained considerable technical importance on account of their specially favourable mechanical properties. It is also applicable to the production of alloys that are relatively low in silicon, such as those employed as anodes in the production of pure aluminium by electrolysis in a molten medium at temperatures below the melting point of electrodes, and having a silicon content that should not, in general, exceed about 22%.

The relatively low-silicon alloys for the said purposes must be particularly free from impurities, especially carbon. However, when they are produced directly by the electrothermic reduction of raw materials containing alumina and silica with carbon, it is inevitable that considerable amounts of carbon pass into the alloy. On the other hand, it is known that Al-Si alloys practically free from carbon can be produced by means of electrothermic reduction melts, if care be taken that the silcon content of the alloy is not less than 30%.

According to the present invention, the desired alloys, relatively low in silicon and free from carbon, can be produced from such high-silicon but practically carbon-free alloys, by subjecting said high-silicon alloys to the hereinbefore described liquation process, which also affords the advantage that the carbidic impurities still contained in the crude alloy pass, with practical completeness, into the solid liquation fraction so that a further refining of the liquid fraction is thereby effected. In this manner, at a temperature approximating to the melting point of the eutectic, a crude alloy containing about 30 to 33% of silicon can be made to furnish a liquid fraction that contains about 16% of silicon and only 0.2% of carbon, and a solid fraction containing about 60% of Si and a large amount of carbon. The former may either be employed directly, for example as anodes in the aforesaid electrolytic refining process, or may, for the production of alloys still lower in silicon, be alloyed with pure aluminium to furnish the desired silicon content of, for example, 12 to 14%.

The solid, high-silicon fraction may, for example, be returned continuously—in place of siliceous material— to the electrothermic process for the production of the high-silicon pre-alloy necessary for the liquation process, so that the amount of siliceous raw material required to be added, in the electrothermic process, is only such as corresponds to the quantity of silcon abstracted in the form of the low-silicon liquation fraction, whilst the superabundant silicon returns, in circulation, from the liquation to the electrothermic process.

*Example*

An aluminium-silicon alloy produced by electrothermic means, and containing 33 to 34% of silicon, was subjected to liquation under the aforesaid conditions. About 50 to 60% of the original amount passed through the filter bed in low-silicon form, the silicon content being for example 13 to 22%. The high-silicon fraction remaining on the filter bed contains for example 45 to 60% of Si.

I claim:

1. A process for separating aluminium-silicon alloys into a higher-silicon and a lower-silicon fraction, which comprises forcing the fluid fraction of the mixture at a temperature at which the higher-silicon fraction of the alloy is present in the solid state and the lower-silicon fraction in a fluid state, through a filter bed of material containing alumina which is in the condition of grains or small lumps, whilst the solid fraction remains on the filter.

2. A process for separating aluminium-silicon alloys into a higher-silicon and a lower-silicon fraction which comprises charging the alloy in a fluid condition on to a filter bed of refractory material in the condition of grains or small lumps, allowing it to cool slowly thereon until the fraction high in silicon separates out in the solid form and then forcing the remaining fluid fraction of the alloy through the filter bed by gaseous pressure.

OSKAR SCHOBER.